(12) United States Patent
Strasser et al.

(10) Patent No.: US 11,954,559 B2
(45) Date of Patent: Apr. 9, 2024

(54) COUNTER

(71) Applicant: GWF MessSysteme AG, Lucerne (CH)

(72) Inventors: Florian Strasser, Lucerne (CH); Thanh Lan Bui, Kriens (CH); Thomas Frey, Küssnacht (CH)

(73) Assignee: GWF MESSSYSTEME AG, Lucerne (CH)

( * ) Notice: Subject to any disclaimer, the term of this patent is extended or adjusted under 35 U.S.C. 154(b) by 81 days.

(21) Appl. No.: 17/775,559

(22) PCT Filed: Aug. 12, 2020

(86) PCT No.: PCT/EP2020/072613
§ 371 (c)(1),
(2) Date: May 9, 2022

(87) PCT Pub. No.: WO2021/094006
PCT Pub. Date: May 20, 2021

(65) Prior Publication Data
US 2022/0391660 A1    Dec. 8, 2022

(30) Foreign Application Priority Data
Nov. 11, 2019  (DE) .................. 102019130387.7

(51) Int. Cl.
*G06M 1/04* (2006.01)
*G01F 15/06* (2022.01)
*G06M 1/06* (2006.01)

(52) U.S. Cl.
CPC ........... *G06M 1/041* (2013.01); *G01F 15/066* (2013.01); *G06M 1/062* (2013.01)

(58) Field of Classification Search
CPC ...... G06M 1/041; G06M 1/062; G01F 15/066
(Continued)

(56) References Cited

U.S. PATENT DOCUMENTS

| 2,099,463 A | 11/1937 | Bradley |
| 3,118,696 A | 1/1964 | Resare |

(Continued)

FOREIGN PATENT DOCUMENTS

| CN | 201867894 U | * 6/2011 |
| DE | 10062807 | 7/2002 |

(Continued)

OTHER PUBLICATIONS

German Office Action dated Apr. 15, 2020 from German Application No. 10 2019 130 387.7.

(Continued)

*Primary Examiner* — Edwyn Labaze
(74) *Attorney, Agent, or Firm* — Beyer Law Group LLP

(57) ABSTRACT

The invention relates to a counter for coupling to a measuring mechanism of a fluid meter, wherein an output of measuring mechanism gear is in operative engagement with a gear on the side of the counter, the gear on the counter being designed to adapt to the rotational direction of the measuring mechanism by means of a change wheel. The invention also relates to a counter, which can be connected to a modular base plate system via a mechanical interface, wherein the base plates of this system can be designed having differently arranged detent or engagement elements.

10 Claims, 4 Drawing Sheets

(58) Field of Classification Search
USPC .............. 235/103, 104, 108–109, 117–119
See application file for complete search history.

(56) References Cited

U.S. PATENT DOCUMENTS

| | | |
|---|---|---|
| 3,816,714 A | 6/1974 | Reed |
| 3,935,433 A | 1/1976 | Cielaszyk et al. |
| 4,296,313 A | 10/1981 | Horner et al. |
| 5,543,613 A | 8/1996 | Mettler |
| 10,114,045 B2 | 10/2018 | Mathis et al. |
| 2008/0184791 A1 | 8/2008 | Crottie |
| 2016/0173665 A1 | 6/2016 | Hantsch |
| 2018/0363747 A1 | 12/2018 | Becka et al. |

FOREIGN PATENT DOCUMENTS

| | | | |
|---|---|---|---|
| EP | 0264544 A2 * | 4/1988 | ............ G06M 1/343 |
| EP | 0633545 | 6/1994 | |
| EP | 1965180 | 2/2008 | |
| SU | 546782 | 2/1977 | |

OTHER PUBLICATIONS

German Search report dated Mar. 30, 2020 from German Application No. 10 2019 130 387.7.
International Search Report dated Jan. 29, 2021 from International Application No. PCT/EP2020/072613.
Russian Office Action dated Oct. 12, 2023 from Russian Application No. 2022114850/11(031241).

* cited by examiner

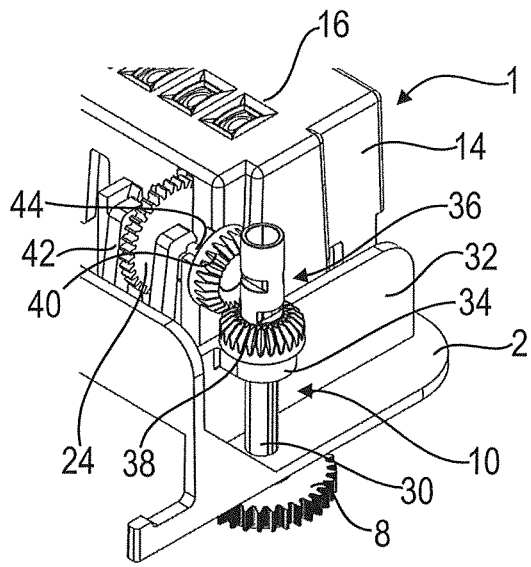
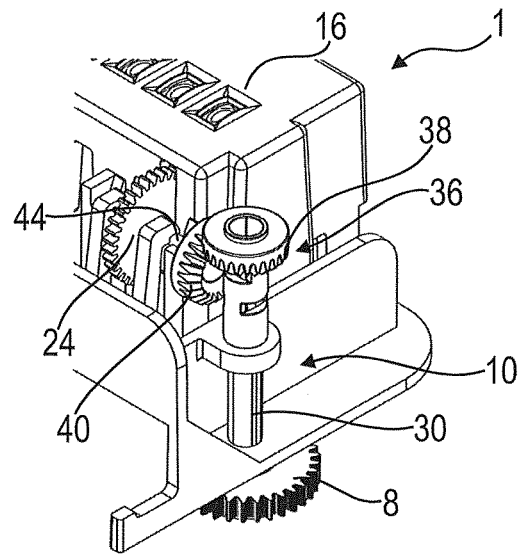
Fig. 3       Fig. 4
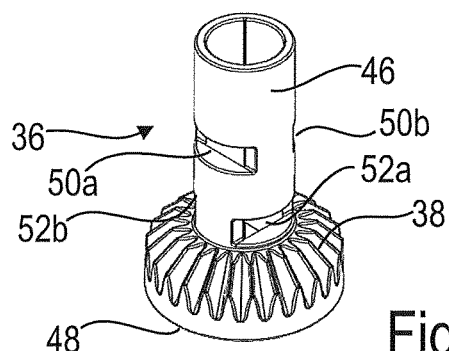
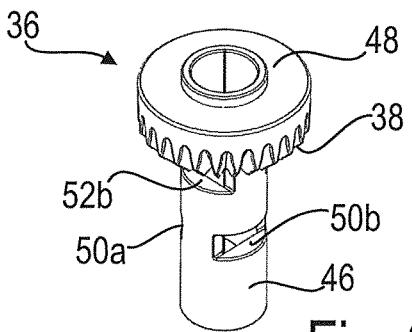
Fig. 5       Fig. 6
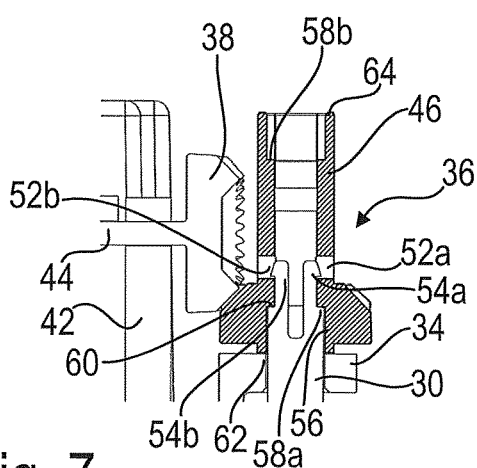
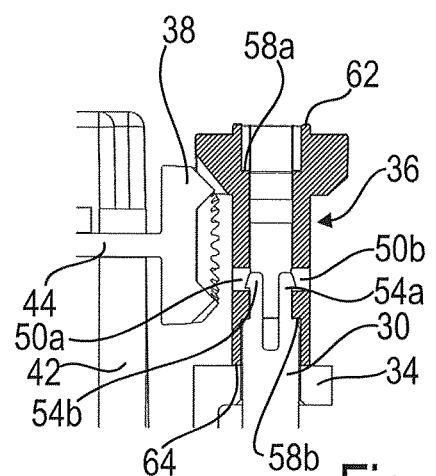
Fig. 7       Fig. 8

COUNTER

The invention relates to a counter in accordance with the preamble of patent claim 1.

The basic design of such a counter is being described, for example, in EP 0 633 545 B1 and EP 1 965 180 A1, both of which have been published by the applicant. In accordance with these documents, a counter is designed for coupling to a measuring mechanism of a gas or water meter—hereinafter referred to as a fluid meter—and has a gear unit on the input side, the gear wheel of which on the output side is driving at least one number roll, which is mounted on an axle of a number roll, and the gear wheel of which on the input side is in operative engagement with a gear wheel of a measuring mechanism gear, so that the number roll is driven as a function of the rotational speed of the gear wheel and the transmission/reduction ratio of the gear. The rotary motion generated is proportional to the volumetric flow rate of the medium which is driving, for example, an impeller of the measuring mechanism. Usually, in addition to the number roll driven—which is the "lowest value" number roll—further number rolls are being mounted on the axle of the number roll, wherein a switching pinion is arranged between two adjacent number roll in each case, by means of which one tenth of the revolution of each lower value number roll is transmitted to the next higher value number roll. In order to determine the consumption, that means the volume, which is flowing through the measuring mechanism during a predetermined period of time, the reading of the roller counter is taken at the beginning and at the end of this period of the time.

The counters, which are being used in these known solutions, for example, are attached to the housing of the measuring mechanism by means of a suitable base plate, wherein, when the operative connection between the reduction gear on the side of the counter and the output of the measuring mechanism gear is being established, care must be taken in order to make sure that the direction of rotation at the output of the measuring mechanism matches the direction of rotation which is being provided for the counter. In order to adapt to different directions of rotation of the measuring mechanism, two counters are usually provided which can be driven either in one direction of rotation (forward) or in the other direction or rotation (backward). During the assembly, the appropriate counter is then selected in accordance with the direction of rotation at the output of the measuring mechanism gear. The associated need to provide two different types of counters (forward drive and backward drive) increases not only the logistical but also the manufacturing effort involved in producing the counter.

From the DE 100 62 807 A1, a unidirectional counter is known which has a display with a unidirectional direction of rotation in the case of a bidirectional direction of rotation drive. For this purpose, two latching tooth ratchet systems, which are connected via a worm wheel and an intermediate wheel, are arranged next to each other in a counter, each of which, considered separately, operatively engage in only one direction of rotation. This means that two different types of counters are arranged in one counter, which are driving a unidirectional totalizing counter display, even if the direction of rotation is reversed, wherein a high level of technical equipment is required, in order to manufacture such a unidirectional counter, since both types of counters have to be manufactured and preassembled in each case.

Compared with this, the invention is based on the task of creating a counter which can be attached with little effort to measuring mechanisms with different directions of rotation.

This task is solved by a counter with the features of the patent claim 1.

Advantageous further embodiments of the invention are the subject of the dependent patent claims.

According to the invention, the counter, which is provided for coupling to a measuring mechanism of a fluid meter, has a gear unit, the output wheel of which drives at least one number roll, which is mounted on an axle, and the input wheel of which, this means, the wheel on the side of the measuring mechanism, can be brought into operative engagement with an output of a measuring mechanism gear. According to the invention, at least one gear wheel of the transmission is designed as a change wheel, which is designed to be repositioned for reversing the direction of rotation within the gear unit.

A solution of this kind makes it possible to provide a single type of counter for both directions of rotation of the measuring mechanism, wherein the adaptation to the direction of rotation is being achieved by simply repositioning the change wheel. This repositioning is selected in such a way that it can be carried out comparatively easily without any complex assembly steps, and preferably without any tools, so that an adaptation is also possible on site in the measuring field.

In a preferred embodiment, the change wheel is mounted on a change axle and has, for example, bevel gear teeth, which mesh with a bevel gear wheel, wherein the change wheel has two mounting positions on the change axle, which are selected in such a way that in a first mounting position the bevel gear wheel is driven in a first direction of rotation and in the second mounting position the bevel gear wheel is driven in the opposite direction. Instead of the bevel gear wheels, which have been mentioned above, other gear elements can of course also be used.

In a very simply designed solution, the change wheel has a hollow shaft which is designed with the bevel gear teeth at one end section, and which can be mounted on the change axle in two positions which are offset by about 180°. In this context, the hollow shaft can be placed on an end section of the change axle.

The repositioning of the change wheel is particularly easy, if the hollow shaft is designed with detent connections for locking with the change axle.

In this case, for example, detent recesses can be formed in the hollow shaft, into which detent elements of the change axle engage through an interior space which is enclosed by the hollow shaft. Of course, a kinematic reversal is also possible, in which the recess is designed on the side of the change axle, and the detent elements are designed on the side of the hollow shaft.

The creation and release of the locking is simplified, if the detent recesses, which are being assigned to the two mounting positions, are formed on the hollow shaft and/or on the change axle offset in the axial direction and/or in the circumferential direction.

The counter can be made in a particularly compact manner, if an axis of rotation of the change wheel is offset by about 90°, and is arranged at a distance from the axle of the number roll.

The gear unit is particularly easy to set up, if the change wheel is being driven directly by the input wheel, because the access to the change wheel is then simplified.

As it has been explained at the beginning—for example, as it has been proposed in the EP 1 965 180 A1—the counter is being mounted by means of a base plate on a measuring mechanism housing of a measuring mechanism of a fluid meter. In order to enable a mounting on different measuring mechanisms, a modular base plate system is assigned to the counter, which, on the one hand, is individually adapted to the respective measuring mechanism, and, on the side of the counter, has a mechanical interface, which is individualized as well, which can be brought into operative engagement with a standardized interface of the counter. In this context, said standardized interface is designed in such a way that it can be attached to base plates which are provided with different interfaces.

By said concept as well, the logistical and manufacturing effort involved in assembling/manufacturing of a counter can be reduced, since a single type of counter can be attached to differently designed measuring mechanisms via a base plate which is being selected from the modular base plate system.

In a preferred embodiment of the invention, a housing of a counter is realized approximately cuboidal with four lateral surfaces, wherein at least two engagement elements are formed on longitudinal surfaces and at least one engagement element is formed on shorter end faces, to which detent elements on the side of the base plate are being assigned, wherein the number of the engagement elements can be greater than the number of the detent elements.

The connection is particularly easy to establish, if the detent elements are detent lugs, which are extending away from the base plate, which can be brought into detent engagement with the engagement elements of the housing of the counter which is being formed with a detent recess. Of course, in kinematic reversal, the detent lugs can also be designed on the side of the counter, and the detent recesses can be formed on the side of the base plate.

Preferred embodiments of the invention are explained in more detail below with reference to schematic drawings. They show:

FIGS. 3 and 4 are detailed representations of the counter in accordance with the FIG. 1 in different functional positions;

FIGS. 5 and 6 are views of a change wheel of the counter in accordance with the FIGS. 1 to 4;

FIGS. 7 and 8 are sectional views of the areas which have been shown in the FIGS. 3 and/or 4;

Figure 1:
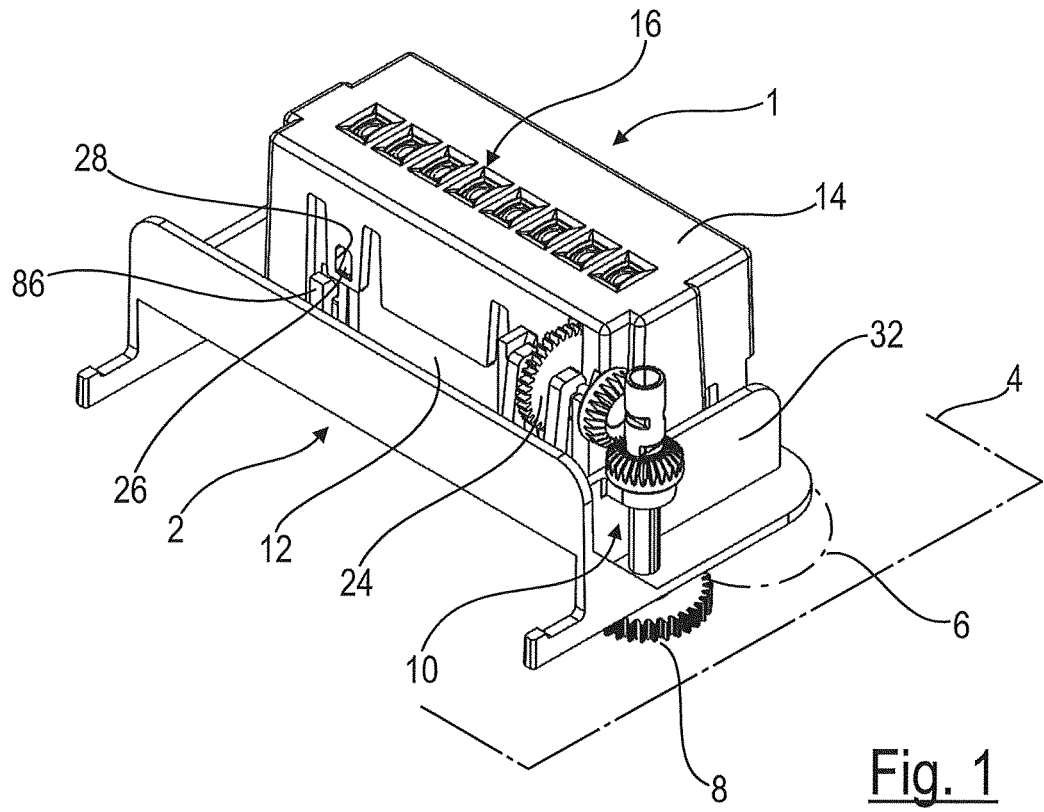
FIG. 1 is a three dimensional representation of a first embodiment of a counter according to the invention which can be connected to a measuring mechanism of a fluid meter via a base plate.

FIG. 1 shows a three dimensional representation of a first embodiment of a counter 1, which is attached by means of a base plate 2 to a measuring mechanism 4 of a fluid meter, for example, a gas meter or a water meter, wherein the measuring mechanism is being indicated by a dotted line. The counter 1 is driven by a measuring mechanism gear, which in turn is driven, for example, by an impeller, which is acted upon by the fluid flow, and of which only a measuring mechanism wheel 6 on the output side of the gear unit is shown in dashed lines in the FIG. 1. In accordance with the FIG. 1, this meshes with an input wheel 8 of a gear of a counter 10, via which the actual counter 1 is driven. In the embodiment, which has been shown, the gear unit 10 is essentially mounted on the base plate 2, which in turn is connected to the counter 1, and thus is forming part of the counter 1. Depending on the type of the measuring mechanism/fluid meter, the base plate 2 can have different structures, wherein, however, the interface on the side of the counter is designed in such way that a single type of counter can be attached to different base plates. This modular base plate system with the corresponding interfaces is explained with reference to the FIGS. 9 to 15.

The counter 1, which is being shown in the FIG. 1, has a counter housing which is basically formed by a lower housing frame 12 and a housing cover 14 mounted thereon, wherein the housing frame 12 is being connected to the base plate 2 via the aforementioned mechanical interface. The housing cover 14, which is also called a shield, has an aperture 16, via which the reading of the counter can be taken. The basic structure of the actual counter is known from the state of the art, which has been described at the beginning, so that only the component parts, which are necessary for the understanding of the invention, are being explained here, and reference is made to the state of the art for the rest.

Figure 2:
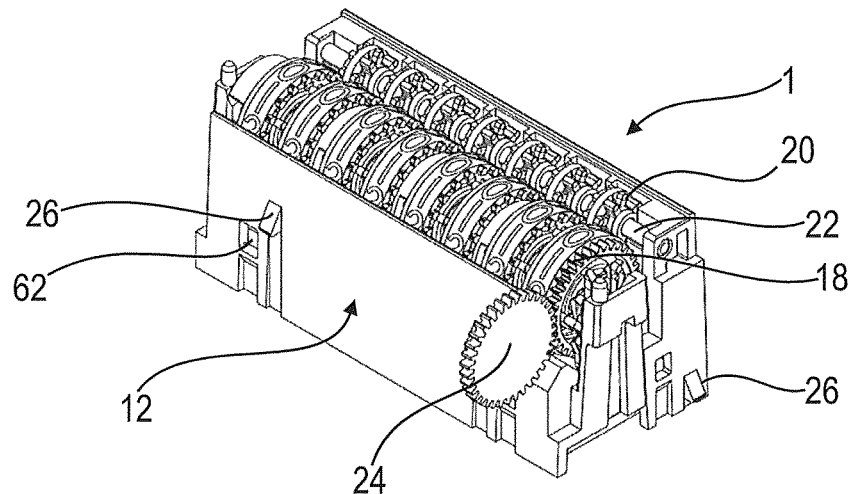
FIG. 2 shows the counter of FIG. 1 without a housing cover.

FIG. 2 shows the counter 1, wherein the cover of the housing cover 14 (shield) is being removed, so that the component parts of the counter, which are accommodated in the housing frame 12, are visible. As it has been described in the aforementioned state of the art, the counter 1 has a plurality of number rolls, of which only the lowest value number roll 18 is marked with a reference numeral in FIG. 2. These are rotatably mounted on a number roll axle. In the embodiment shown, this one is carrying eight number rolls 18. A switching pinion 20 is provided between two adjacent number rolls 18 each. Accordingly, a total of seven switching pinions 20 is assigned to the eight number rolls 18 which switching pinions are mounted on a switching pinion shaft 22. By means of a switching pinion 20, which is arranged between two adjacent number rolls 18, one tenth each of the revolution of the lower value number roll 18 is transmitted to the next higher value number roll, so that the volume can be displayed and read to exactly eight digits in the illustrated embodiment. In the embodiment shown, a sensor arrangement is also assigned to this mechanical part of the counter 1, via which the display status of the counter 1 can be read out electronically—this read out electronics is not visible in the representation in accordance with the FIG. 2. The lowest value number roll 18 is driven by an output wheel 24 of the gear unit 10, which is being indicated in the FIG. 2 which is essentially supported on the base plate 2 in accordance with the representation in the FIG. 1.

Protruding detent tongues 26 are formed on the side wall of the housing frame 12, which snap into recesses 28 on the side of the housing cover, in order to fix the housing cover 14 to the housing frame 12, as this is shown in the FIG. 1. In the embodiment, which has been shown, two detent tongues 26 are formed on longitudinal surfaces of the housing frame 12 at a distance from each other, and one detent tongue 26 each is formed on the shorter end faces, to which corresponding recesses 28 on the housing cover 14 are assigned.

In the FIGS. 3 and 4 the area of the counter 1, in which the gear unit 10 is arranged, is shown. As it has been explained at the beginning, an input wheel 8 of the gear unit 10 meshes with the output wheel 6 (which is not being shown in the FIGS. 3 and 4) of the measuring mechanism 4.

In the embodiment shown, the input wheel 8 is arranged on the large surface of the base plate 2, which is remote from the actual counter 1, and is mounted on a change axle 30 which passes through a bottom wall of the base plate 2 in the vertical direction. In the embodiment shown, the base plate 2 is designed with a support frame 32, which surrounds the actual counter 1 in sections, and on which a bearing bracket 34 is formed for mounting the change axle 30 which is extending in the vertical direction in the FIG. 3. Above the bearing bracket 34 (view in accordance with the FIGS. 3, 4), a change wheel 36 is mounted on this change axle 30, which is designed with bevel gear teeth 38 which are meshing with a bevel gear wheel 40 which is fastened to an output shaft 44 mounted on a support bracket 42 of the base plate 2. At an end section of the output shaft 44, which is remote from the bevel gear wheel 40, the output wheel 24 is fixed, by means of which the lowest value number roll 18 is being driven. Due to the two bevel gear wheels, which are meshing with each other, the change axle 30 and the output shaft 44 accordingly are set at right angles to each other as well.

The FIGS. 5 and 6 show individual representations of the change wheel 36, wherein in the FIG. 5 the change wheel is shown in the installation position in accordance with the FIG. 3, while the FIG. 6 shows the change wheel in the installation position in accordance with the FIG. 4.

Accordingly, the change wheel 36 has a hollow shaft 46, which can be placed coaxially on the end section of the change axle 30, wherein the end section of the hollow shaft, which is located at the bottom in the FIG. 5, is radially expanded to form a bevel gear collar 48 on which the bevel gear teeth 38 are formed.

As it can also be seen from the FIG. 5, two engagement recesses 50a, 50b and/or 52a, 52b are formed on the hollow shaft 46, which are axially spaced apart from one another and are each offset by 90°, which can be brought into operative engagement with engagement elements 54a, 54b (see the FIGS. 7 and 8) of the change axle 30 depending on the installation position of the change wheel 36.

As it has been explained in the introductory part of the description, the direction of rotation of the measuring mechanism wheel 6 can be different depending on the type of the counter of the measuring mechanism 4. In order to adapt the counter 1 to the different directions of rotation, the bevel gear teeth 38 of the change wheel 36 can be arranged on the one hand, as it is shown in the FIGS. 3, 4, with regard to the bevel gear wheel 40 at the bottom, or by turning the change wheel 36 (see the FIGS. 4, 6) with regard to the bevel gear wheel 40 at the top, so that the direction of rotation is reversed depending on the relative position of the change wheel 36.

The respective installation position is also shown in the FIGS. 7 and 8, which is showing a sectional view in the FIG. 3 and in the FIG. 4 along the axis of the change axle 30. From this sectional view, it can be clearly seen that two resilient engagement elements 54a, 54b are formed on the end section of the change axle 30, which, depending on the installation position of the change wheel 36, can be brought into detent engagement with the engagement recesses 52a, 52b and/or 50a, 50b in order to fix the change wheel 36 to the change axle 30 in the radial direction and in the axial direction. In this case, the end section of the change axle 30, which is shown in the FIGS. 7 and 8, fits into a stepped internal bore 56, wherein, depending on the installation position, a radial shoulder 58a, 58b, which is formed by an enlarged part of the internal bore 56, is resting on an annular end face 60 of the change axle 30. The two engagement elements 54a, 54b, which are formed on the ring end face 60, fit into the interior space of the hollow shaft 46, and are locked with the engagement recesses 50a, 50b and/or 52a, 52b. An additional axial support is provided by the fact that one of the two end faces 62, 64 of the change wheel 36 is supported on the bearing bracket 34 in each installation position (see the FIGS. 7, 8), so that the change wheel 36 is connected to the change axle 30 in a rotationally fixed manner and in a fixed position in the radial direction as well as in the axial direction.

An additional positional fixation can be achieved by the fact that the change wheel 36 is materially connected to the change axle 30, after it has been mounted in a manner that matches the direction of rotation.

Figure 9:
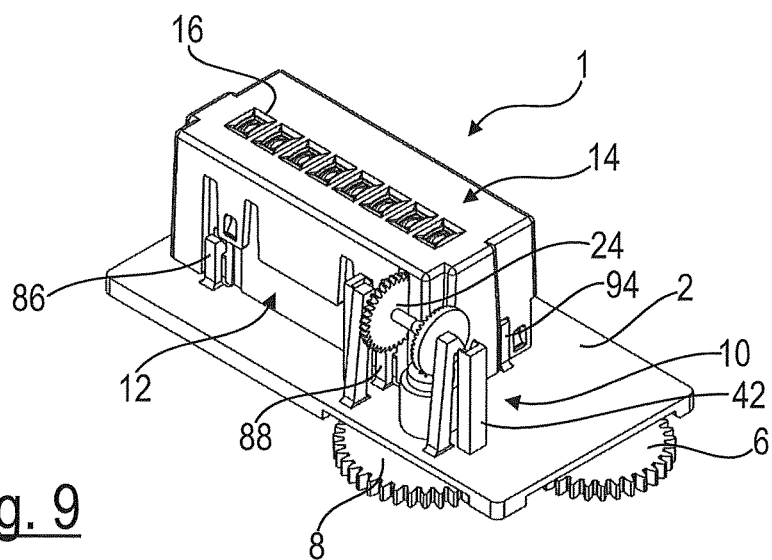
FIG. 9 shows another embodiment of a counter according to the invention with a base plate.

A further special feature of the solution according to the invention is explained with reference to the FIGS. 9 to 15. The FIG. 9 shows a further embodiment of a counter 1 which differs from the embodiment in accordance with the FIGS. 1 to 8 in the shape of the base plate 2. In this embodiment shown, the base plate 2 has a largely smooth surface, is formed without the support frame in accordance with the FIG. 1, wherein the gear unit 10 also has a somewhat different structure than in the embodiment which is being shown in the FIG. 1. But the structure of this gear unit 10 is playing only a subordinate role in the following considerations, since the interface between the actual counter 1 and the base plate 2 is to be explained on the basis of the FIGS. 9 to 15. As in the previously described embodiment, the counter 1 has a housing with a housing frame 12, to which the housing cover 14 with the aperture 16 is attached in the manner which has been described above. According to the invention, said counter 1 is designed in such a way that it can be attached to different measuring mechanisms 4 via a modular base plate system with different base plates 2, without requiring any design modification of the actual counter 1. This is achieved by the fact that a "standardized" interface is being provided on the side of the counter, which interface is designed in such a way that different base plates 2 with different engagement elements can be brought into operative engagement with the housing of the counter.

Figures 10, 11:
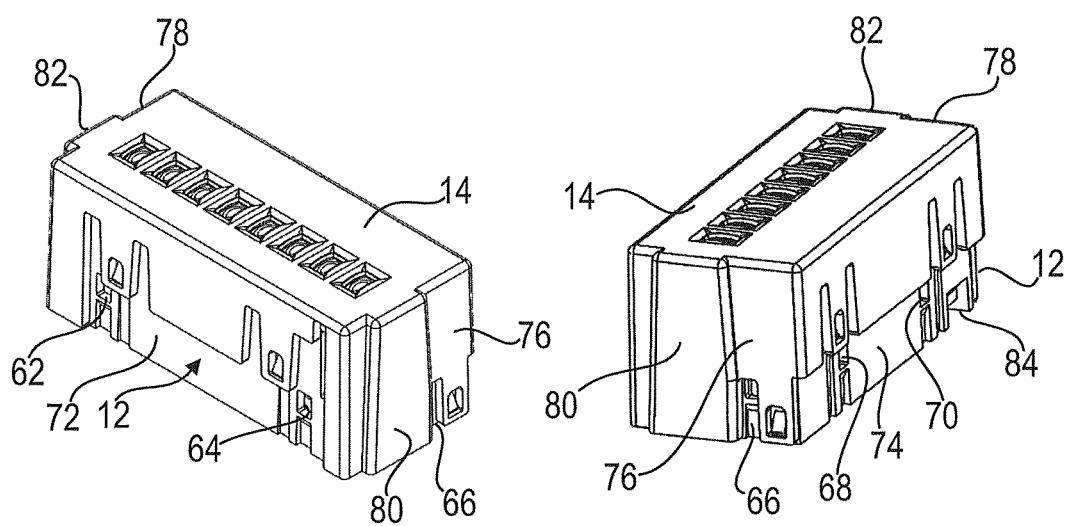
FIGS. 10 and 11 are individual representations of the counter in accordance with the FIG. 9 without a base plate.

In the embodiment shown, the interface on the side of the counter is formed by several engagement elements, which are formed on the outer circumference of the housing frame 12, which engagement elements are formed as engagement recesses 62, 64, 66, 68, 70 in accordance with the FIGS. 10 and 11, which is displaying the counter 1 without a base plate 2, and a further engagement recess 98 (see the FIG. 13) which is not visible in the FIGS. 10, 11. In accordance with the representations in the FIGS. 10 and 11, in each case two engagement recesses 62, 64 and/or 68, 70 are formed at a distance from one another on longitudinal surfaces 72, 74 of the housing frame 12. The two further engagement recesses 66, 98 are arranged on end faces 76 and/or 78 of the housing frame 12. The two engagement recesses 66, 98 on the end faces are formed in the transition region to a front rib 80, 82 of the housing cover 14, which front rib is projecting from the respective end face 76, 78, so that the detent elements on the side of the base plate, which are being described below, are supported laterally on the front ribs 80, 82, and on the circumferential surfaces of the engagement recesses 62, 64, 66, 68, 70, 98 as well. The reference numeral 84 in the FIG. 11 indicates a duct for a cable or for the attachment of a plug.

Figure 12:
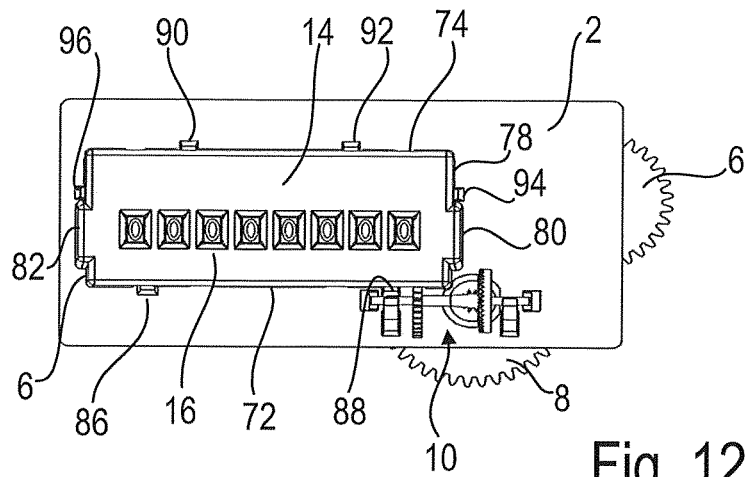
FIG. 12 is a top view of the counter in accordance with the FIG. 9.
Figure 13:
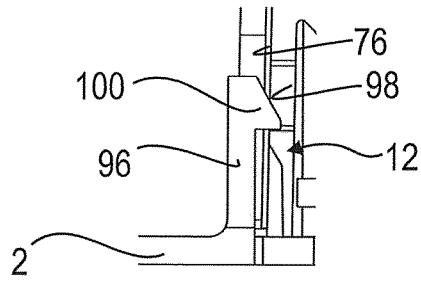
FIG. 13 is a sectional detailed representation of the counter in accordance with the FIGS. 1 to 12 and FIGS. 14 and 15 are three dimensional sectional views of the counter in accordance with the FIG. 9.
Figure 14:
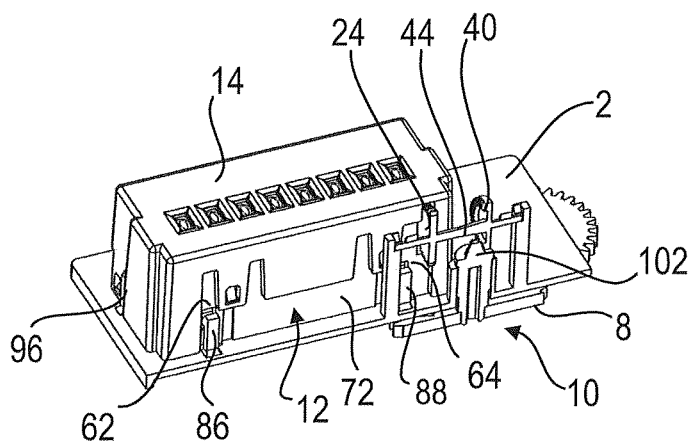

The arrangement of the detent elements, which can be brought into engagement with the engagement recesses 62, 64, 66, 68, 70, 98, which, in the embodiments shown, are formed as detent lugs 86, 88, 90, 92, 94, 96, is apparent in particular from the FIGS. 9 and 12. Accordingly, the detent lugs 86, 88, 90, 92, 94, 96 are formed on the bearing surface of the base plate 2, which is visible in the FIG. 12, and project in the direction of the counter 1, so that they can be brought into detent engagement with the corresponding engagement recess 62, 64, 66, 68, 70, 98. In the top view in accordance with the FIG. 12, the lateral support of the detent lugs 94, 96 on the two front ribs 80, 82 of the housing cover 14 can also be seen quite clearly.

The detent engagement is explained again with reference to the FIG. 13, which is showing, for example, the engagement of the detent lug 96 on the front face into the rear engagement recess 98 on the end face 76, which is not visible in the FIGS. 10 and 11. Accordingly, the detent lug 96 has a detent projection 100, which is precisely fitting into the opening of the engagement recess 98, and thus is connecting the housing of the counter, or more precisely, the housing frame 12, to the base plate 2.

But for the functional connection of the base plate 2 to the housing of the counter, it is not necessary that six detent lugs 86, 88, 90, 92, 94, 96 are being formed on the base plate 2—it is also sufficient, for example, to provide four detent lugs corresponding to the position pattern of the interface on the side of the housing of the counter, in order to mount the housing of the counter. This means that, depending on the design of the counter of the measuring mechanism, different base plates with a different number and positioning of detent lugs can be provided, wherein their basic pattern, however, is adapted to the respective interface, so that the base plates of this modular base plate system can be connected to the interface of the housing of the counter without any modification whatsoever.

Figure 15:
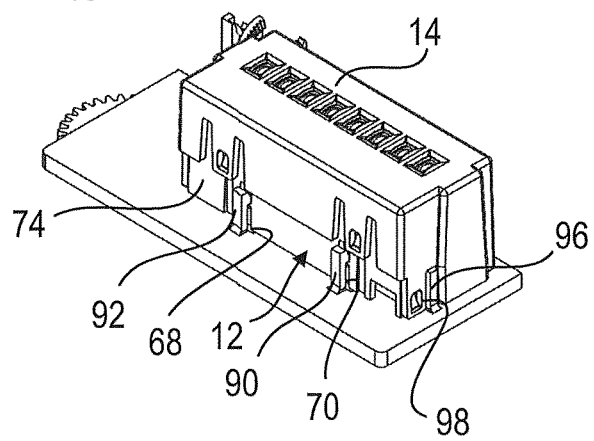

This concept is explained again with reference to the FIGS. 14 and 15, which are showing the embodiment in accordance with the FIG. 9 in a sectional view, wherein the sectional plane is passing through the gear unit 10. In this representation, it can be seen that in this embodiment as well, the input wheel 8 of the gear unit 10 is driving a bevel gear wheel 102 which, in contrast to the previously described embodiment, is not formed as a change wheel. This in turn is meshing—as in the case of the previously described embodiment—with the bevel gear wheel 40, which drives the output wheel 24 via the output shaft 44. The latter is meshing—as it has been explained above—with the lowest value number roll 18. In the representation in accordance with the FIG. 14, the detent lugs 86, 88, 96 can be seen, which are engaging into the associated engagement recesses 62, 64, 98. The FIG. 15 shows the rear view, so that the detent lugs 90, 92 and the associated engagement recesses 68, 70, which are located on the other longitudinal side 74, can be seen accordingly. In these two representations, the locking between the housing frame 12 and the housing cover 14 can also be clearly seen.

The invention relates to a counter for coupling to a measuring mechanism of a fluid meter, wherein an output of a measuring mechanism gear is in operative engagement with a gear on the side of the counter, wherein the gear on the counter is being designed to adapt to the rotational direction of the measuring mechanism by means of a change wheel. The invention also relates to a counter, which can be connected to a modular base plate system via a mechanical interface, wherein the base plates of this system can be designed having differently arranged detent or engagement elements.

LIST OF REFERENCE NUMERALS

1 counter
2 base plate
4 measuring mechanism counter
6 measuring mechanism wheel
8 input wheel
10 gear of the counter
12 housing frame
14 housing cover
16 aperture
18 number roll
20 switching pinion
22 switching pinion shaft
24 output wheel
26 detent tongue
28 recess
30 change axle
32 support frame
34 bearing bracket
36 change wheel
38 bevel gear teeth
40 bevel gear wheel
42 support bracket
44 output shaft
46 hollow shaft
48 bevel gear collar
50 engagement recess
52 engagement recess
54 engagement element
56 internal bore
58 radial shoulder
60 annular end face
62 engagement recess
64 engagement recess
66 engagement recess
68 engagement recess
70 engagement recess
72 longitudinal surface
74 longitudinal surface
76 end face
78 end face
80 front rib
82 front rib
84 duct
86 detent lug
88 detent lug
90 detent lug
92 detent lug
94 detent lug
96 detent lug
98 engagement recess
100 detent projection
102 bevel gear wheel

The invention claimed is:

1. Counter for coupling to a measuring mechanism of a fluid meter, comprising a gear unit, the output wheel of which is driving at least one number roll, which is mounted on an axle, and the input wheel is designed to be brought in operative engagement with an output of a measuring mechanism gear, wherein a gear wheel of the gear unit is a change wheel which is designed to be repositioned for reversing the direction of rotation wherein the change wheel comprises teeth, which mesh with a gear wheel, wherein the change wheel can be mounted on the change axle in two mounting positions, wherein the mounting positions are selected in such a way, that in a first mounting position the gear wheel is driven in a first direction of rotation, and in the second mounting position the gear wheel is driven in the opposite direction.

2. Counter according to patent claim 1, wherein the change wheel comprises a hollow shaft, at the end section of which the teeth are designed, and which can be mounted on the change axle in two positions which are offset by about 180°.

3. Counter according to patent claim 2, comprising detent connections for locking the hollow shaft with the change axle.

4. Counter according to patent claim 3, wherein detent recesses are formed in the hollow shaft, into which engagement elements, formed on the side of the change axle, engage through the interior space which is enclosed by the hollow shaft.

5. Counter according to patent claim 4, wherein the detent recesses, assigned to the two mounting positions, are formed on the hollow shaft offset in the axial direction and/or in the circumferential direction.

6. Counter according to patent claim 5, wherein an axis of rotation of the change wheel is offset by 90°, and is arranged at a distance from the number roll axle.

7. Counter according to patent claim 1, wherein the change wheel is driven by the input wheel.

8. Counter for coupling to a measuring mechanism of a fluid or electricity meter, comprising a gear unit, the output wheel of which drives at least one number roll, which is mounted on a number roll axle, and the input wheel of which is designed to be brought into operative engagement with an output of a measuring mechanism gear, wherein the counter has a counter housing, to which a modular base plate system with different base plates is assigned for attachment to the measuring mechanism, which base plates can be connected to the housing of the counter via a mechanical interface, wherein the mechanical interface comprises engagement elements on the side of the counter, the position pattern of which is selected in such a way that it can be brought into operative engagement with detent elements of the base plate system arranged on the side of the base plate in different position patterns.

9. Counter according to patent claim 8, wherein the housing of the counter is realized in an approximately cuboidal manner, wherein at least two engagement elements each are formed on longitudinal surfaces and at least one engagement element each is formed on shorter end faces, to which detent elements on the side of the base plate are assigned, wherein the number of the engagement elements can be/is greater than the number of the detent elements.

10. Counter according to patent claim 9, wherein the detent elements are detent lugs, which are extending away from the base plate, which detent lugs can be brought into detent engagement with the engagement elements of the housing of the counter which are formed as engagement recesses.

* * * * *